(12) United States Patent
Hanamura et al.

(10) Patent No.: US 8,687,254 B2
(45) Date of Patent: Apr. 1, 2014

(54) OPTICAL FILTER AND OPTICAL MODULE HAVING OPTICAL FILTER

(75) Inventors: Yuki Hanamura, Nagano (JP); Takeo Funakawa, Nagano (JP); Tsukasa Funasaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 172 days.

(21) Appl. No.: 12/628,754

(22) Filed: Dec. 1, 2009

(65) Prior Publication Data

US 2010/0142067 A1  Jun. 10, 2010

(30) Foreign Application Priority Data

Dec. 9, 2008  (JP) ................. 2008-313306

(51) Int. Cl.
*G02B 26/08* (2006.01)

(52) U.S. Cl.
USPC .................................... 359/224.1

(58) Field of Classification Search
USPC ............................. 359/224.1, 850
See application file for complete search history.

(56) References Cited

U.S. PATENT DOCUMENTS

| 6,795,603 | B2 | 9/2004 | Utsunomiya |
| 7,190,523 | B2 | 3/2007 | Yoda |
| 7,304,800 | B2 | 12/2007 | Nakamura et al. |
| 2005/0122191 | A1* | 6/2005 | Nakamura et al. ............ 333/202 |
| 2010/0067084 | A1 | 3/2010 | Hagihara et al. |
| 2010/0142067 | A1* | 6/2010 | Hanamura et al. ............ 359/850 |

FOREIGN PATENT DOCUMENTS

| JP | 2003-29172 A | 1/2003 |
| JP | 2003-57438 A | 2/2003 |
| JP | 2005-031115 A | 2/2005 |
| JP | 2005-165067 A | 6/2005 |
| JP | 2007-143342 A | 6/2007 |
| JP | 2007-326195 A | 12/2007 |
| JP | 2008-96620 A | 4/2008 |
| JP | 2008-116669 A | 5/2008 |
| JP | 2008-181040 A | 8/2008 |
| WO | 2008/090921 A1 | 7/2008 |

* cited by examiner

*Primary Examiner* — Jennifer L. Doak

(74) *Attorney, Agent, or Firm* — Global IP Counselors, LLP

(57) ABSTRACT

An optical filter comprising a first substrate, a first mirror formed on the first substrate, a second substrate coupled to the first substrate, the second substrate including a concave portion, and a second mirror formed on the concave portion and facing the first mirror, wherein the first substrate includes a first portion located on the first mirror, a second portion located around the first portion, a third portion located around the second portion, and a fourth portion located around the third portion, wherein both a thickness of the second portion and a thickness of the fourth portion are equal to or smaller than a thickness of the first portion.

7 Claims, 6 Drawing Sheets

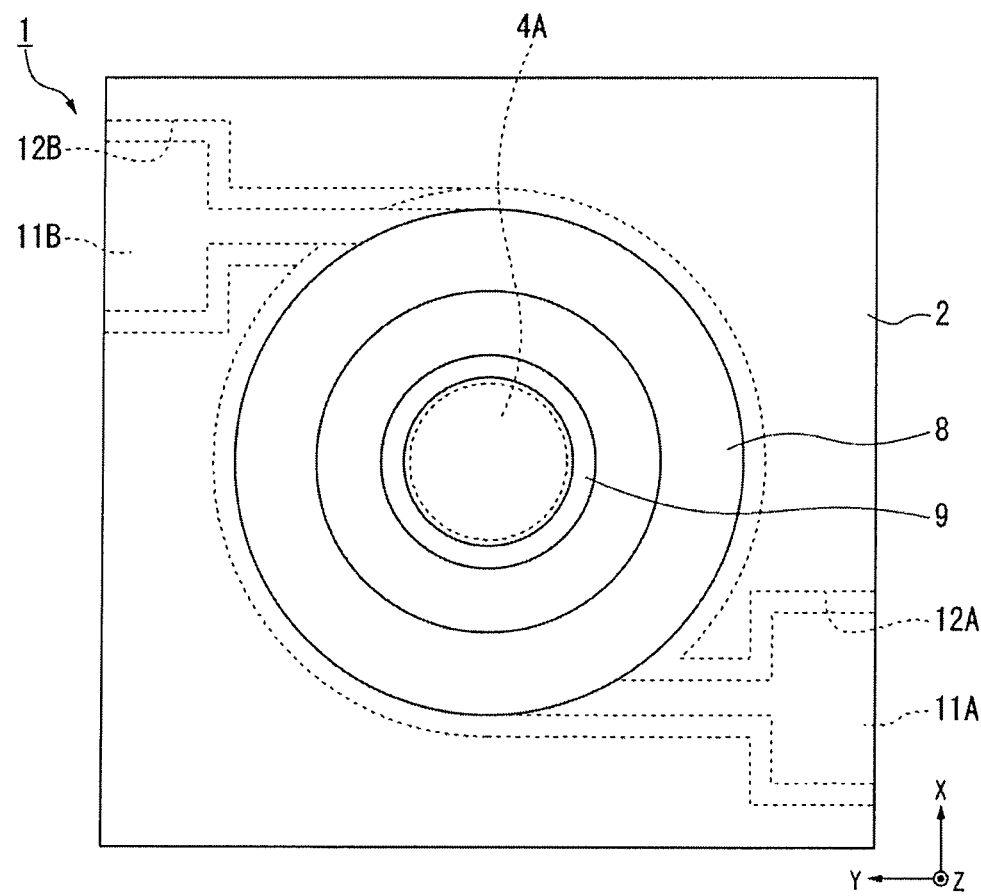
F I G. 1
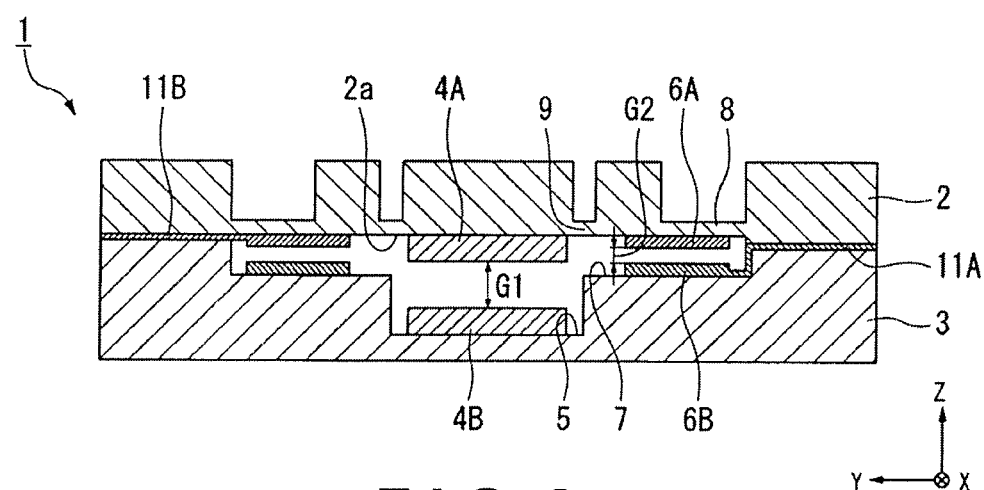
F I G. 2

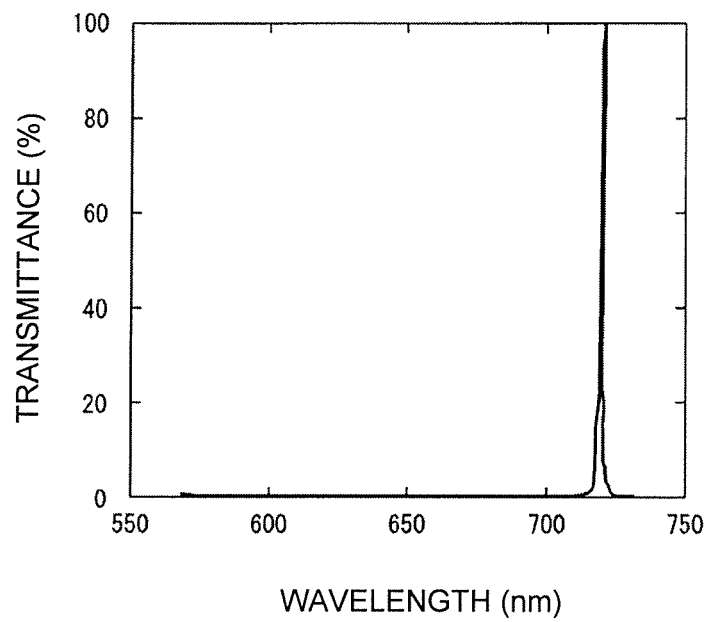
F I G. 3
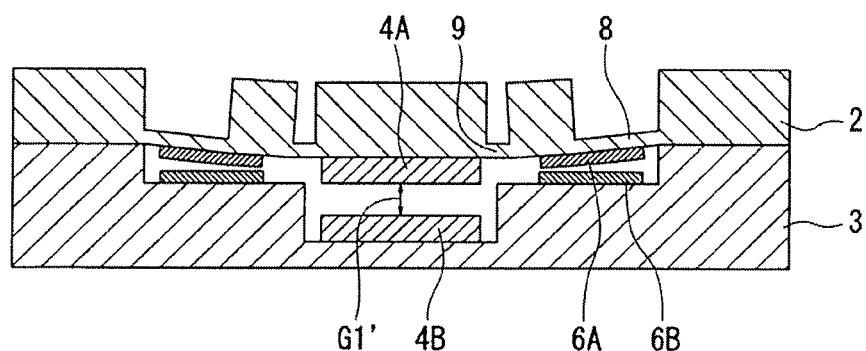
F I G. 4

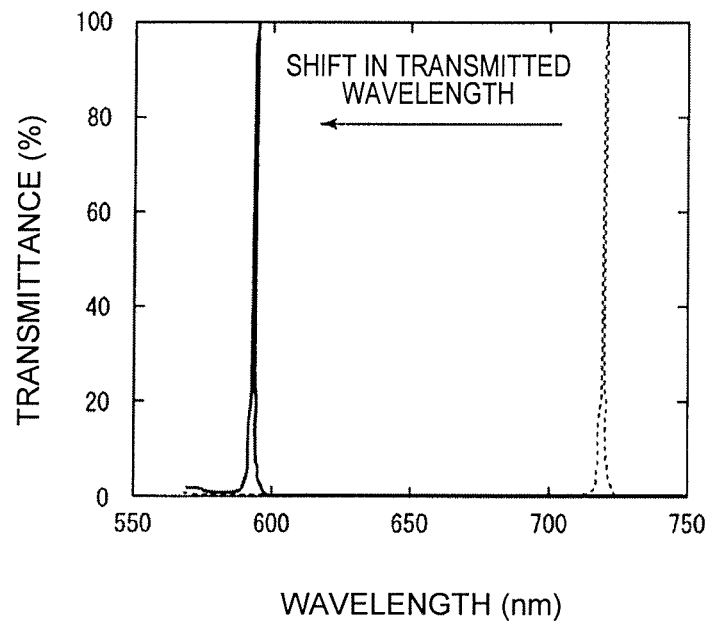
F I G. 5
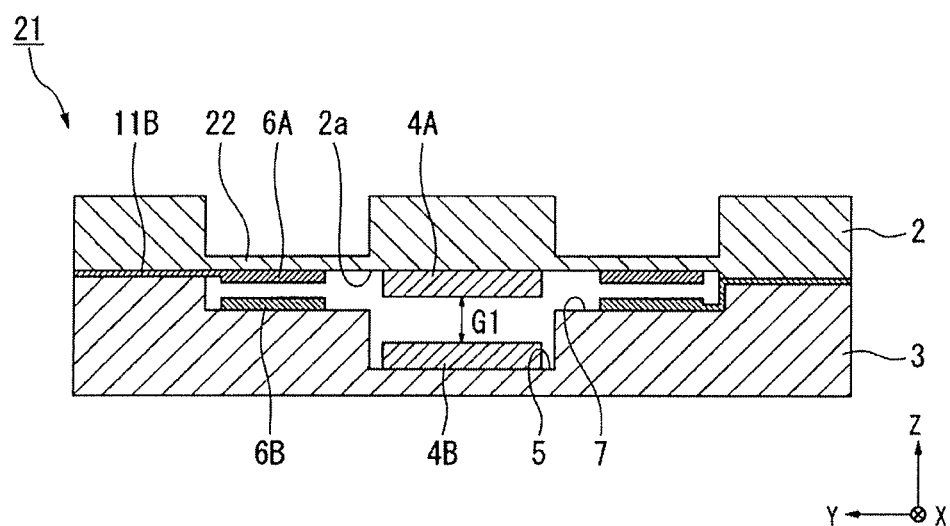
F I G. 6

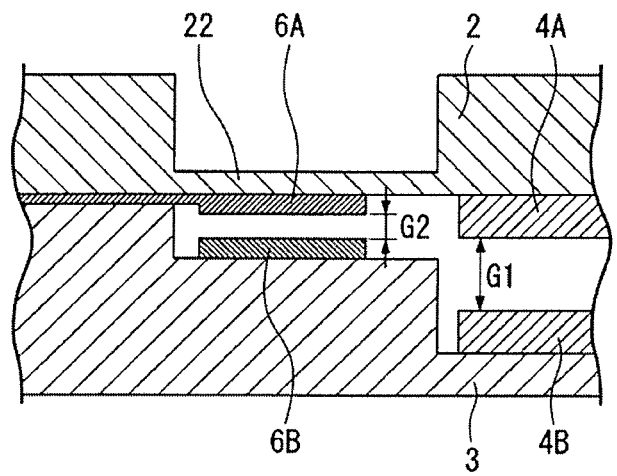
F I G. 7
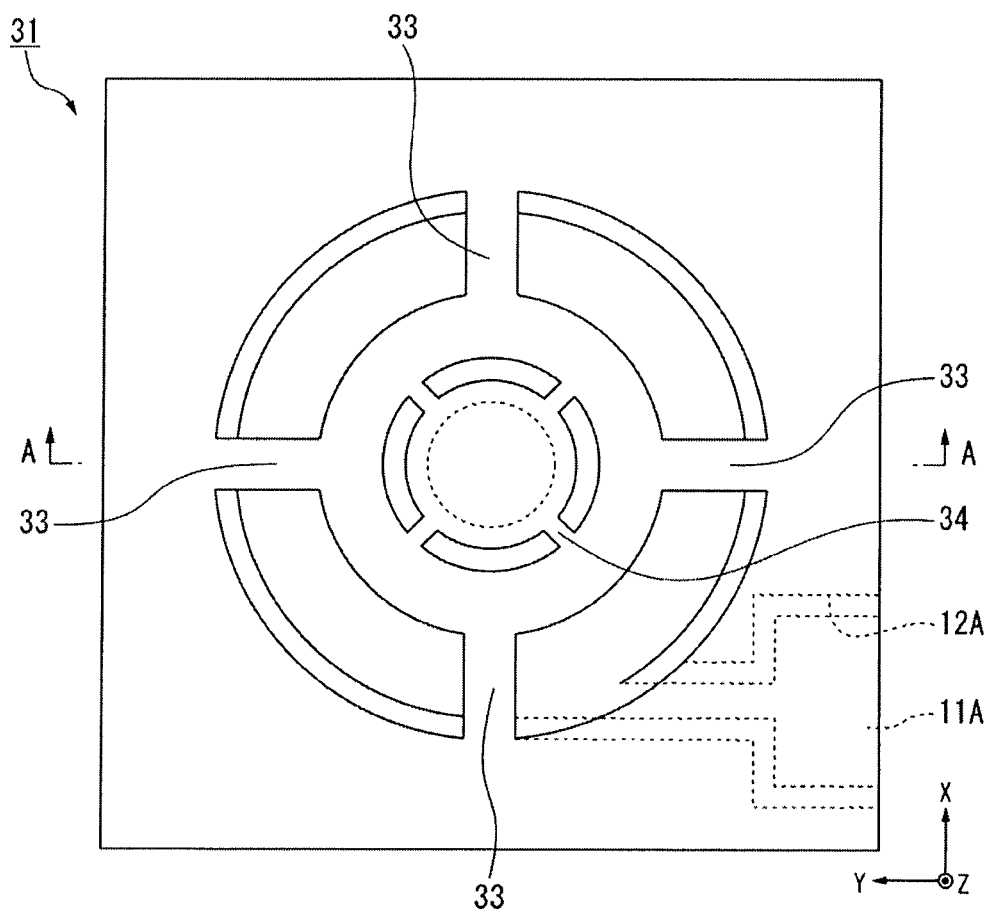
F I G. 8

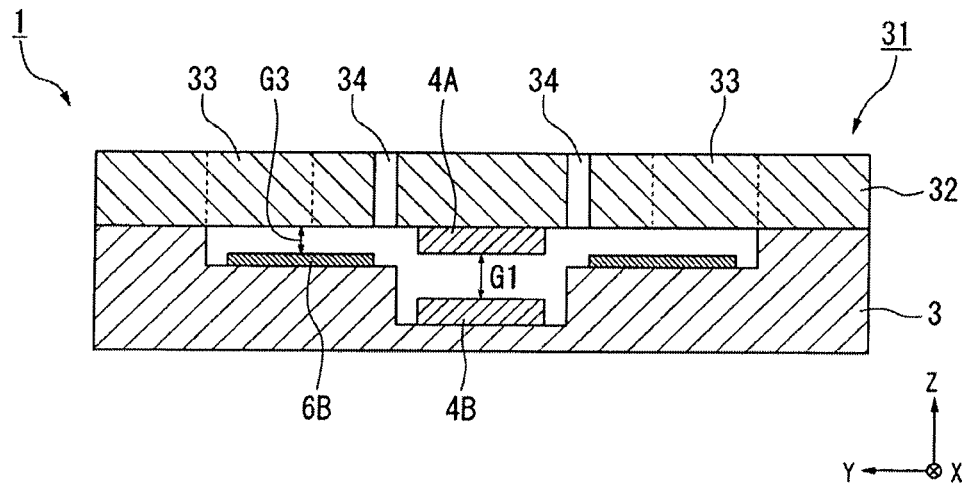
F I G. 9
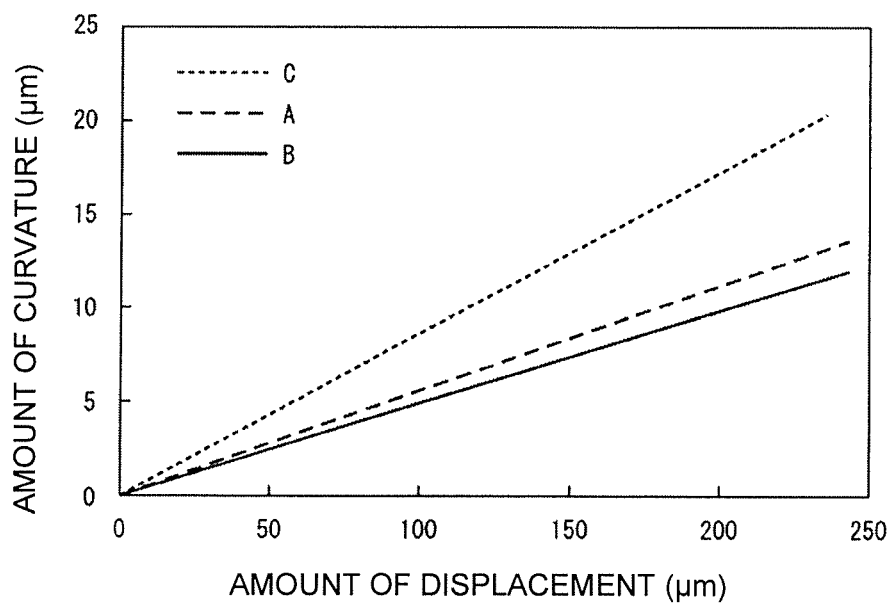
F I G. 10

OPTICAL FILTER AND OPTICAL MODULE HAVING OPTICAL FILTER

CROSS-REFERENCE TO RELATED APPLICATIONS

This application claims priority to Japanese Patent Application No. 2008-313306 filed on Dec. 9, 2008. The entire disclosure of Japanese Patent Application No. 2008-313306 is hereby incorporated herein by reference.

BACKGROUND

1. Technical Field

The present invention relates to an optical filter and to an optical module that is provided with the optical filter.

2. Related Art

Conventional air-gap-type electrostatically actuated optical filters are known as optical filters for selectively emitting a desired wavelength of light from incident light. In such filters, a pair of substrates are arranged facing each other, a mirror is provided to each of the opposing surfaces of the substrates, electrodes are provided on the periphery of the mirrors, a diaphragm portion is provided on the periphery of one mirror, and the diaphragm portion is displaced by electrostatic force between the electrodes to vary the gap (air gap) between the mirrors, whereby the desired wavelength of light is extracted (see Japanese Laid-Open Patent Publication No. 2003-57438 and Japanese Laid-Open Patent Publication No. 2008-116669, for example).

In such an optical filter, the gap between the pair of mirrors must be controlled in an extremely narrow range of less than one micron to several microns during manufacturing, and it is important that the gap between the mirrors be precisely maintained and controlled to the desired size.

In such an optical filter, the wavelength of light that corresponds to the gap between the mirrors can be selectively extracted by varying the gap between the mirrors.

SUMMARY

In the conventional air-gap-type electrostatically actuated optical filter, since the spectral characteristics of the extracted light decline when the parallelism between the mirrors or the degree of flatness of the mirrors is reduced, keeping the pair of mirrors parallel and flat is most important for maintaining the characteristics of the optical filter.

However, when the gap between the mirrors is made variable by air gap electrostatic actuation in order to selectively extract the desired wavelength of light from the optical filter, bending of the diaphragm portion is propagated to the mirror on the movable side, and the mirror curves and the flatness thereof is reduced. Consequently, the maximum transmittance of the extracted light is reduced, and a so-called broad waveform having an increased half bandwidth is exhibited. As a result, severe adverse effects occur in the spectral characteristics of the extracted light.

The present invention was developed in order to overcome the problems described above, it being an object thereof to provide an optical filter and optical module provided with the same whereby bending that accompanies variability of the gap between the mirrors can be prevented from propagating to the mirror on the movable side, and as a result, light having high maximum transmittance, a narrow half bandwidth, and excellent spectral characteristics can be extracted, and the spectral characteristics of the extracted light can be satisfactorily maintained without adversely affecting the spectral characteristics, even when the gap between the mirrors is made variable in order to selectively extract the desired wavelength of light.

In order to overcome the problems described above, the present invention employs the optical filter and optical module provided with the optical filter as described below.

An optical filter according to a first aspect of the invention includes a first substrate, a first mirror formed on the first substrate, a second substrate coupled to the first substrate and including a concave portion, and a second mirror formed on the concave portion and facing the first mirror. The first substrate includes a first portion located on the first mirror, a second portion located around the first portion, a third portion located around the second portion, and a fourth portion located around the third portion. Both a thickness of the second portion and a thickness of the fourth portion are equal to or smaller than a thickness of the first portion.

In the optical filter of the first aspect of the present invention, a second diaphragm portion (e.g., the second portion) is formed on one or both of the inner peripheral side and outer peripheral side of a first diaphragm portion (e.g., the fourth portion). Bending that occurs in the first diaphragm portion is thereby mitigated by the second diaphragm portion, and the amount of bending propagated to the mirror on the movable side is reduced even when the gap between the mirrors is made variable in order to selectively extract the desired wavelength of light from the optical filter. Curving of the mirror on the movable side due to this bending is thereby minimized, reduction of the flatness of the mirror is minimized, and the light extracted from the mirrors has high maximum transmittance and a narrow half bandwidth. Light having excellent spectral characteristics can thereby be extracted, and the spectral characteristics of the extracted light can be satisfactorily maintained without adversely affecting the spectral characteristics.

It is thereby possible to provide an optical filter whereby light having excellent spectral characteristics can be extracted, and the spectral characteristics of the extracted light can be satisfactorily maintained without adversely affecting the spectral characteristics.

In the optical filter as described above, the thickness of the second portion may be equal to or smaller than the thickness of the fourth portion.

In this optical filter, the wall thickness of the second portion is equal to or less than the wall thickness of the fourth portion. Bending in the fourth portion is thereby more efficiently mitigated by the second portion, and the amount of bending propagated to the mirror on the movable side is significantly reduced. The amount of curving of the mirror on the movable side that occurs due to the bending is thereby made extremely small, reduction of the flatness of the mirror is made extremely small, the maximum transmittance of the light extracted from the mirrors is extremely high, and the half bandwidth thereof is extremely narrow. Light having excellent spectral characteristics can thereby be extracted, and the spectral characteristics of the extracted light can be satisfactorily maintained without adversely affecting the spectral characteristics.

In the optical filter as described above, both the second portion and the fourth portion may be formed by selective removal of the first substrate.

In this optical filter, by forming the second and fourth portions by selective removal of one or both of the first substrate and second substrate, the fabrication precision between and of each of the second and fourth portions is increased, and the light extracted from the mirrors is endowed with extremely excellent spectral characteristics.

In the optical filter as described above, the second portion and the fourth portion may be integrated.

In this optical filter, by integrating the second and fourth portions, the bending occurring in the fourth portion that is mitigated by the second portion and fourth portions individually is mitigated by the integrated portions at once, and can thereby be more efficiently mitigated.

In the optical filter as described above, the first substrate and the second substrate are preferably optically transparent.

In this optical filter, by making the first substrate and second substrate optically transparent, the transmittance of light in the substrates is enhanced, and the intensity of the extracted light is also increased. The efficiency of light extraction is thereby enhanced.

An optical filter according to a second aspect of the invention includes a first substrate, a first mirror formed on the first substrate, a second substrate coupled to the first substrate and including a concave portion, a second mirror formed on the concave portion and facing the first mirror, and an electrode formed on the second substrate and around the second mirror. The first substrate includes a plurality of first hinge portions and a plurality of second hinge portions inside the plurality of first hinge portions.

In the optical filter of the second aspect of the present invention, at least one second hinge portion is formed on one or both of the inner peripheral side and outer peripheral side of the first hinge portion. Bending that occurs in the first hinge portion is thereby mitigated by the second hinge portion, and the amount of bending propagated to the mirror on the movable side is reduced even when the gap between the mirrors is made variable in order to selectively extract the desired wavelength of light from the optical filter. Curving of the mirror on the movable side due to this bending is thereby minimized, reduction of the flatness of the mirror is minimized, and the light extracted from the mirrors has high maximum transmittance and a narrow half bandwidth. Light having excellent spectral characteristics can thereby be extracted, and the spectral characteristics of the extracted light can be satisfactorily maintained without adversely affecting the spectral characteristics.

It is thereby possible to provide an optical filter whereby light having excellent spectral characteristics can be extracted, and the spectral characteristics of the extracted light can be satisfactorily maintained without adversely affecting the spectral characteristics.

In the optical filter as described above, at least one of the plurality of the first hinge portions may have a first beam width, at least one of the plurality of the second hinge portions may have a second beam width, and the first beam width may be equal to or larger than the second beam width.

In this optical filter, the beam width of the second hinge portion is equal to or less than the beam width of the first hinge portion. Bending in the first hinge portion is thereby more efficiently mitigated by the second hinge portion, and the amount of bending propagated to the mirror on the movable side is significantly reduced. The amount of curving of the mirror on the movable side that occurs due to the bending is thereby made extremely small, reduction of the flatness of the mirror is made extremely small, the maximum transmittance of the light extracted from the mirrors is extremely high, and the half bandwidth thereof is extremely narrow. Light having excellent spectral characteristics can thereby be extracted, and the spectral characteristics of the extracted light can be satisfactorily maintained without adversely affecting the spectral characteristics.

In the optical filter as described above, the at least one of the first and second substrates is preferably made of semiconductor material.

In this optical filter, making one of the first substrate and the second substrate a semiconductor material enables use of electromagnetic waves, e.g., near-infrared rays that are capable of passing through the semiconductor material as the incident light. The range of wavelengths of the incident light is thereby increased.

An optical module according to another aspect of the invention includes the optical filter according to the first or second aspects as described above.

Providing the optical module with the optical filter according to the first or second aspects of the present invention makes it possible to provide an optical module that is capable of extracting light having a high maximum transmittance, a narrow half bandwidth, and excellent spectral characteristics, and of maintaining satisfactory spectral characteristics of the extracted light without adversely affecting the spectral characteristics.

BRIEF DESCRIPTION OF THE DRAWINGS

Referring now to the attached drawings which form a part of this original disclosure:

FIG. 1 is a plan view showing the optical filter according to the first embodiment of the present invention;

FIG. 2 is a sectional view showing the optical filter according to the first embodiment of the present invention;

FIG. 3 is a view showing the relationship between the wavelength and transmittance when a voltage is not applied in the optical filter according to the first embodiment of the present invention;

FIG. 4 is a schematic view showing the state of bending when a voltage is applied in the optical filter according to the first embodiment of the present invention;

FIG. 5 is a view showing the relationship between the wavelength and transmittance when a voltage is applied in the optical filter according to the first embodiment of the present invention;

FIG. 6 is a sectional view showing the optical filter according to the second embodiment of the present invention;

FIG. 7 is an enlarged sectional view showing the relevant portion of the optical filter according to the second embodiment of the present invention;

FIG. 8 is a plan view showing the optical filter according to the third embodiment of the present invention;

FIG. 9 is a sectional view showing the optical filter according to the third embodiment of the present invention;

FIG. 10 is a view showing the results of a simulation of the curvature-reducing effects of the optical filter of the present invention.

DETAILED DESCRIPTION OF EXEMPLARY EMBODIMENTS

Figure 11:
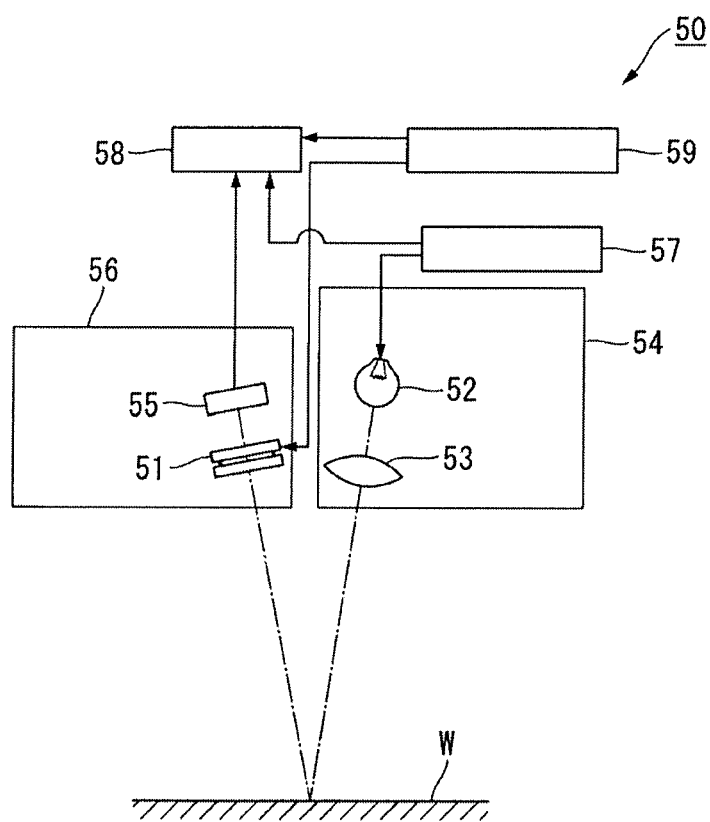
FIG. 11 is a view showing an embodiment of the optical filter device module of the present invention.

Preferred embodiments of the optical filter and optical module provided with the optical filter of the present invention will next be described.

An air-gap-type electrostatically actuated optical filter will be described as the optical filter.

In the following description, an XYZ orthogonal coordinate system is set, and the positional relationships of members will be described with reference to this XYZ orthogonal coordinate system as needed. In this system, a predetermined direction in the horizontal plane is designated as the X-axis direction, the direction orthogonal to the X-axis direction in the horizontal plane is designated as the Y-axis direction, and the direction orthogonal to the X-axis direction and Y-axis direction (i.e., the vertical direction) is designated as the Z-axis direction.

First Embodiment

FIG. 1 is a plan view showing the optical filter of the present embodiment, and FIG. 2 is a sectional view showing the optical filter of the present embodiment. In the drawings, the reference numeral 1 refers to an optical filter including an air-gap-type electrostatically actuated etalon element, and this optical filter 1 includes a first substrate 2; a second substrate 3 joined (or bonded) to the first substrate 2 so as to face the first substrate 2; a circular mirror 4A (a mirror member) provided at the center of an opposing surface 2a of the first substrate 2; a circular mirror 4B (a mirror member) provided to the bottom of a first cavity 5 formed in the center of the second substrate 3, the circular mirror 4B being provided opposite the mirror 4A across a first gap G1; a ring-shaped electrode 6A provided on the periphery of the mirror 4A of the first substrate 2; a ring-shaped electrode 6B provided in a shallow ring-shaped second cavity 7 formed on the periphery of the first cavity 5 of the second substrate 3, and opposite the electrode 6A across a second gap G2; a ring-shaped first diaphragm portion 8 having a small wall thickness formed by etching (selective removal) in the first substrate 2 in a position that substantially corresponds to the outer peripheral part of the electrode 6A; and a ring-shaped second diaphragm portion 9 having a thickness equal to or less than that of the diaphragm portion 8, and formed by etching (selective removal) in the first substrate 2 outside the mirror 4A and on the inner peripheral side of the diaphragm portion 8. As shown in FIGS. 1 and 2, in this embodiment, the first substrate 2 includes a first portion located on the mirror 4A, a second portion located around the first portion, a third portion located around the second portion, and a fourth portion located around the third portion. The second portion of the first substrate 2 corresponds to the second diaphragm portion 9, and the fourth portion of the first substrate corresponds to the first diaphragm portion 8.

The diaphragm portion 8 and the electrodes 6A, 6B provided opposite each other across the second gap G2 constitute an electrostatic actuator.

The first substrate 2 and second substrate 3 are both rectangles (squares) of optically transparent material having insulation properties, and are preferably composed particularly of glass or another transparent material.

Specific examples of glass that can be suitably used include soda glass, crystallized glass, quartz glass, lead glass, potassium glass, borosilicate glass, sodium borosilicate glass, non-alkali glass, and the like.

Making both the first substrate 2 and the second substrate 3 an optically transparent material enables electromagnetic waves or visible light rays having the desired wavelength spectrum to be used as the incident light.

Forming both the first substrate 2 and the second substrate 3 out of a semiconductor material, e.g., silicon, enables near-infrared rays to be used as the incident light.

The mirrors 4A, 4B are arranged facing each other across a first gap G1, and therefore include dielectric multilayer films in which a plurality of high-refractive-index layers and low-refractive-index layers is layered in alternating fashion. The mirrors 4A, 4B are not limited to dielectric multilayer films, and a carbon-containing silver alloy film or the like, for example, may also be used.

The mirror 4A of the mirrors 4A, 4B is provided to the first substrate 2, which is capable of changing shape, and the mirror 4A is therefore referred to as the movable mirror. The other mirror 4B is provided to the second substrate 3, which does not change shape, and the mirror 4B is therefore referred to as the fixed mirror.

When the optical filter 1 is used in the visible light region or the infrared region, titanium oxide ($Ti_2O$), tantalum oxide ($Ta_2O_5$), niobium oxide ($Nb_2O_5$), or the like, for example, is used as the material for forming the high-refractive-index layers in the dielectric multilayer film. When the optical filter 1 is used in the ultraviolet region, aluminum oxide ($Al_2O_3$), hafnium oxide ($HfO_2$), zirconium oxide ($ZrO_2$), thorium oxide ($ThO_2$), or the like, for example, is used as the material for forming the high-refractive-index layers.

Magnesium fluoride ($MgF_2$), silicon dioxide ($SiO_2$), or the like, for example, is used as the material for forming the low-refractive-index layers in the dielectric multilayer film.

The thickness and number of layers of high-refractive-index layers and low-refractive-index layers are appropriately set based on the required optical characteristics. In general, when a reflective film (mirror) is formed by a dielectric multilayer film, the number of layers needed to obtain the optical characteristics is 12 or more.

The electrodes 6A, 6B are arranged facing each other across the second gap G2, an electrostatic force is generated between the electrodes 6A, 6B according to an inputted drive voltage, and the electrodes 6A, 6B constitute a portion of an electrostatic actuator for moving the mirrors 4A, 4B relative to each other in a state in which the mirrors 4A, 4B are facing each other.

The electrodes 6A, 6B are thus configured so that the diaphragm portions 8, 9 are displaced in the vertical direction of FIG. 2, the first gap G1 between the mirrors 4A, 4B is varied, and light having a wavelength that corresponds to the first gap G1 is emitted.

In the present embodiment, since the opposing surface 2a of the first substrate 2, and the second cavity 7 formed in the second substrate 3 are parallel to each other, the electrodes 6A, 6B are also parallel to each other.

The material for forming the electrodes 6A, 6B is not particularly limited insofar as the material is conductive, and examples of materials that can be used include Cr, Al, Al alloy, Ni, Zn, Ti, Au, and other metals; resins in which carbon, titanium, or the like is dispersed; polycrystalline silicon (polysilicon), amorphous silicon, and other silicon; silicon nitride, ITO, and other transparent conductive materials; and other materials.

As shown in FIG. 1, interconnections 11A, 11B are connected to the electrodes 6A, 6B, and the electrodes 6A, 6B are connected to a power supply (not shown) via the interconnections 11A, 11B.

The interconnections 11A, 11B are formed in an interconnection groove 12A formed in the first substrate 2, or an interconnection groove 12B formed in the second substrate 3. Consequently, there is no interference at the junction of the first substrate 2 and second substrate 3.

A power supply drives the electrodes 6A, 6B by application of a voltage to the electrodes 6A, 6B as a drive signal, and generates a desired electrostatic force between the electrodes 6A, 6B. A control device (not shown) is connected to the power supply, and the power supply is controlled by the control device, whereby the difference of potential between the electrodes 6A, 6B can be adjusted.

The diaphragm portion 8 is thinner than the portion of the first substrate 2 in which the diaphragm portion 8 is not formed. The area of the first substrate 2 thinner than the remainder thereof is therefore elastic (flexible) and capable of deformation (displacement), and therefore the diaphragm portion 8 has wavelength selection capability whereby the desired wavelength of light is emitted by varying the first gap G1 to change the interval between the mirrors 4A, 4B to the interval that corresponds to the desired wavelength of light.

The diaphragm portion 9 is formed between the mirrors 4A, 4B and the electrodes 6A, 6B that constitute a portion of the electrostatic actuator, and therefore has a smaller thickness than the diaphragm portion 8. Since the diaphragm portion 9 has a thickness equal to or less than that of the diaphragm portion 8, the diaphragm portion 9 is more flexible than the diaphragm portion 8, and as a result, is able to absorb bending that occurs in the diaphragm portion 8 and prevent this bending from propagating to the mirror 4A. Bending that occurs in the diaphragm portion 8 when the first gap G1 is varied can thereby be efficiently mitigated, and the amount of bending that propagates to the mirror 4A can be significantly reduced.

The shape or thickness of each of the diaphragm portions 8, 9, the interval between the diaphragm portions 8, 9, and other characteristics are arbitrary insofar as light in the desired wavelength range is emitted. Specifically, these characteristics are set with consideration for the amount of variation, rate of variation, and other characteristics of the interval between the mirrors 4A, 4B, and in accordance with the wavelength range of emitted light needed from the optical filter 1.

The diaphragm portions 8, 9 are formed by etching (selective removal) from the upper surface of the first substrate 2, but the diaphragm portions 8, 9 are of sufficient thickness insofar as the diaphragm portion 9 can absorb bending that occurs in the diaphragm portion 8 and suppress propagation of this bending to the mirror 4A, and the diaphragm portions 8, 9 may also be formed by etching (selective removal of) the first substrate 2 from both the upper and lower surfaces thereof.

In the optical filter 1 of the present embodiment, when the control device and the power supply are not activated, and a voltage is thus not applied between the electrode 6A and electrode 6B, the mirror 4A and the mirror 4B face each other across the first gap G1. Therefore, when light is incident on the optical filter 1, a wavelength of light that corresponds to the first gap G1 is emitted; e.g., light having a wavelength of 720 nm is emitted, as shown in FIG. 3.

When the control device and power supply are driven, and a voltage is applied between the electrode 6A and the electrode 6B, an electrostatic force corresponding to the size of the voltage (potential difference) is generated between the electrode 6A and electrode 6B. The control device thus controls the power supply, whereby the desired voltage can be applied between the electrodes 6A, 6B, and the desired electrostatic force can be generated between the electrode 6A and electrode 6B. When the desired electrostatic force is generated between the electrodes 6A, 6B in this manner, the electrodes 6A, 6B are pulled toward each other by the electrostatic force, the first substrate 2 deforms toward the second substrate 3, and the first gap G1 between the mirror 4A and the mirror 4B is made smaller than when a voltage was not applied, as shown in FIG. 4.

In this case, the bending that occurs in the diaphragm portion 8 due to the electrostatic force is absorbed and mitigated by the diaphragm portion 9 on the inside, and the bending that occurs in the diaphragm portion 8 is therefore not propagated as such to the mirror 4A. The amount of bending propagated to the mirror 4A can therefore be reduced, the curvature of the mirror 4A caused by this bending is minimized, and reduction of the flatness of the mirror 4A is minimized. Bending that occurs in the diaphragm portion 8 is thus absorbed by the diaphragm portion 9 and efficiently suppressed, and curvature and reduction of the flatness of the mirror 4A due to this bending are also suppressed. As a result, there is extremely little curvature of the mirror 4A, and the flatness of the mirror 4A is also satisfactorily maintained.

Since the bending that occurs in the diaphragm portion 8 is absorbed by the diaphragm portion 9 and efficiently suppressed, and is not propagated to the mirror 4A, the flatness of the mirror 4A is satisfactorily maintained, and the mirror 4A and mirror 4B face each other across a stable first gap G1'.

Therefore, when light is incident on the optical filter 1, a wavelength of light corresponding to the stabilized first gap G1' and having high maximum transmittance and a narrow half bandwidth is emitted; e.g., light having a wavelength of 590 nm is emitted, and the transmitted wavelength is shifted to a shorter wavelength, as shown in FIG. 5.

As described above, in the optical filter 1 of the present embodiment, since a ring-shaped diaphragm portion 9 having a thickness equal to or less than that of the diaphragm portion 8 is formed in the first substrate 2 on the inner peripheral side of the diaphragm portion 8, light having excellent spectral characteristics can be extracted, and the spectral characteristics of the extracted light can be satisfactorily maintained without adversely affecting the spectral characteristics.

Second Embodiment

FIG. 6 is a sectional view showing the optical filter of the present embodiment, and FIG. 7 is an enlarged sectional view showing the relevant portion of FIG. 6.

In the optical filter 1 of the first embodiment, the ring-shaped diaphragm portion 9 having a thickness equal to or less than that of the diaphragm portion 8 is formed at a predetermined interval in the first substrate 2 and on the inner peripheral side of the diaphragm portion 8, whereas the optical filter 21 of the present embodiment differs from the optical filter 1 of the first embodiment in that the diaphragm portions 8, 9 are integrated to form a single wide ring-shaped diaphragm portion 22. The other constituent elements of the optical filter 21 of the present embodiment are the same those of the optical filter 1 of the first embodiment.

The shape or thickness of the diaphragm portion 22, and other characteristics are arbitrary insofar as light in the desired wavelength range is emitted. Specifically, these characteristics are set with consideration for the amount of variation, rate of variation, and other characteristics of the interval between the mirrors 4A, 4B, and in accordance with the wavelength range of emitted light needed from the optical filter 21.

The diaphragm portion 22 is formed by etching (selective removal) from the upper surface of the first substrate 2, but the diaphragm portion 22 is of sufficient thickness insofar as the diaphragm portion 22 can absorb bending that occurs in the diaphragm portion 22 and suppress propagation of this bending to the mirror 4A, and the diaphragm portion 22 may also be formed by etching (selective removal of) the first substrate 2 from both the upper and lower surfaces thereof.

As described above, in the optical filter 21 of the present embodiment, since the diaphragm portion 22 is formed in the first substrate 2, light having excellent spectral characteristics can be extracted, and the spectral characteristics of the extracted light can be satisfactorily maintained without adversely affecting the spectral characteristics.

Moreover, by integrating the first diaphragm portion 8 and the second diaphragm portion 9 of the first embodiment into the diaphragm portion 22 in the second embodiment, the bending occurring in the first diaphragm portion 8 that is mitigated by the first diaphragm portion 8 and the second diaphragm portion 9 individually is mitigated by the integrated diaphragm portions 22 at once, and can thereby be more efficiently mitigated.

Third Embodiment

FIG. 8 is a plan view showing the optical filter of the present embodiment, and FIG. 9 is a sectional view showing the optical filter of the present embodiment.

In the optical filter 1 of the first embodiment, the first substrate 2 is formed by glass or another optical transparent material, the electrodes 6A, 6B are provided to the first substrate 2 and second substrate 3 so as to face each other across the second gap G2, the ring-shaped diaphragm portion 8 is formed in a position substantially corresponding to the outer peripheral portion of the electrode 6A in the first substrate 2, and the ring-shaped diaphragm portion 9 having a thickness equal to or less than that of the diaphragm portion 8 is formed on the inner peripheral side of the diaphragm portion 8. However, the optical filter 31 of the present embodiment differs from the optical filter 1 of the first embodiment in that a first substrate 32 is formed using silicon or another semiconductor material, the electrode 6A is not provided to the first substrate 32, first hinge portions 33 are formed in the first substrate 32 in a plurality of positions (in four locations in FIG. 8) substantially corresponding to the outer peripheral portion of the electrode 6B, and second hinge portions 34 having a beam thickness equal to or less than that of the first hinge portions 33 are formed in a plurality of positions (in four locations in FIG. 8) outside the mirror 4A and on the inner peripheral side of the first hinge portions 33. The other constituent elements of the optical filter 31 of the present embodiment are the same as those of the optical filter 1 of the first embodiment.

The first hinge portions 33, the electrode 6B, the second hinge portions 34, and a second gap G3 between the electrode 6B and the first substrate 32 constitute an electrostatic actuator.

The first hinge portions 33 and the second hinge portions 34 are formed so that the longitudinal directions thereof are at 45° angles from each other.

Specifically, a total of four first hinge portions 33, two parallel to the X-axis direction and two parallel to the Y-axis direction, are formed at equal intervals on the periphery that substantially corresponds to the outer peripheral portion of the electrode 6B.

Four second hinge portions 34 at 45° angles to the X-axis direction and Y-axis direction are also formed at equal intervals on the periphery that substantially corresponds to the outer peripheral portion of the mirror 4A, on the inner peripheral side of the first hinge portions 33.

In the optical filter 31 of the present embodiment, when the control device is not being driven, the mirror 4A and the mirror 4B face each other across the second gap G3. Therefore, when light is incident on the optical filter 1, a wavelength of light that corresponds to the first gap G1 is emitted; e.g., light having a wavelength of 720 nm is emitted.

An electrostatic force is generated when the control device is driven, the first substrate 32 is deformed toward the second substrate 3 by the electrostatic force, and the first gap G1 between the mirror 4A and the mirror 4B is made smaller than when a voltage is not applied.

In this case, the bending that occurs in the hinge portions 33 due to the electrostatic force is absorbed and mitigated by the hinge portions 34 on the inside, and the bending that occurs in the hinge portions 33 is therefore not propagated as such to the mirror 4A. The amount of bending propagated to the mirror 4A can therefore be reduced, the curvature of the mirror 4A caused by this bending is minimized, and reduction of the flatness of the mirror 4A is minimized. Bending that occurs in the hinge portions 33 is thus absorbed by the hinge portions 34 and efficiently suppressed, and curvature and reduction of the flatness of the mirror 4A due to this bending are also suppressed. As a result, there is extremely little curvature of the mirror 4A, and the flatness of the mirror 4A is also satisfactorily maintained.

Since the bending that occurs in the hinge portions 33 is absorbed by the hinge portions 34 and efficiently suppressed, and is not propagated to the mirror 4A, the flatness of the mirror 4A is satisfactorily maintained, and the mirror 4A and mirror 4B face each other across a stable first gap G1'.

Therefore, when light is incident on the optical filter 1, a wavelength of light corresponding to the stabilized first gap G1' and having high maximum transmittance and a narrow half bandwidth is emitted; e.g., light having a wavelength of 590 nm is emitted, and the transmitted wavelength is shifted to a shorter wavelength.

As described above, in the optical filter 1 of the present embodiment, since first hinge portions 33 are formed in the first substrate 32 in a plurality of positions substantially corresponding to the outer peripheral portion of the electrode 6B, and second hinge portions 34 having a beam thickness equal to or less than that of the first hinge portions 33 are formed in a plurality of positions outside the mirror 4A and on the inner peripheral side of the first hinge portions 33, light having excellent spectral characteristics can be extracted, and the spectral characteristics of the extracted light can be satisfactorily maintained without adversely affecting the spectral characteristics.

FIG. 10 is a diagram showing the results of a simulation (finite element analysis) of the curvature-reducing effects of the optical filter of the present invention. In the diagram, "A" indicates the optical filter 1 of the first embodiment, "B" indicates the optical filter 21 of the second embodiment, and "C" indicates the conventional optical filter.

According to FIG. 10, the amount of curvature in the mirror increases linearly for all of the structures as the amount of displacement due to voltage application increases, but the amount of curvature with respect to displacement is smaller in the optical filters 1, 21 of the present invention than in the conventional optical filter, and the effects of the present invention are confirmed by the simulation results.

For example, 17 μm of curvature occurs in the conventional optical filter for 200 μm of displacement, whereas the curvature stays at 10 to 11 μm in the optical filters 1, 21 of the present invention, and the amount of curvature can be reduced approximately 40% relative to the conventional optical filter.

An optical filter device module (optical module) provided with the optical filter 1 (21, 31) will next be described as an application of the optical filters 1, 21, 31 of the present embodiments.

FIG. 11 is a view showing an embodiment of the optical filter device module of the present invention, and in FIG. 11, the reference numeral 50 refers to an optical filter device module.

The optical filter device module 50 is provided with a filter unit 51 including the optical filter 1 (21, 31), and the optical filter device module 50 is configured so that a specific spectrum of light is radiated to a specimen W, a pre-set wavelength of light is selectively extracted (diffracted) from the light reflected by the specimen W, and the intensity of the extracted light is measured.

Specifically, the optical filter device module 50 is provided with a light source optical system 54 for radiating a predetermined light, e.g., visible light or infrared rays, to the specimen W, the light source optical system 54 having a light source 52 and a lens 53; a detector optical system 56 for detecting reflected light from the specimen W, the detector optical system 56 having a filter unit 51 and a detection element 55; a light source control circuit 57 for controlling the illumination intensity and other characteristics of the light source 52; a filter control circuit 58 for controlling the filter unit 51; and a processor 59 for receiving detection signals detected by the detection element 55, the processor 59 being connected to the light source control circuit 57 and the filter control circuit 58.

In such an optical filter device module 50, a specific spectrum of light such as visible light or infrared rays is radiated to the specimen W. Light is then reflected according to the surface state of the specimen W, for example, and other factors, and the reflected light enters the filter unit 51. The filter unit 51 is configured so that a voltage is applied (or not applied) to the electrodes 6A, 6B so that light having a pre-set wavelength is selectively extracted (diffracted). Only a specific wavelength band is thereby selectively extracted from the reflected light and detected by the detection element 55. Consequently, reflected light can be detected with high sensitivity by using a detection element that selectively detects the light extracted by the filter unit 51 as the detection element 55, for example.

The optical filter device module 50 thereby enables the surface state and other characteristics of the specimen W to be detected with high sensitivity.

Since the optical filter 1 (21, 31) described above is used as the optical filter constituting the filter unit 51, the module is capable of extracting light having excellent spectral characteristics, and the spectral characteristics of the extracted light can be satisfactorily maintained without adversely affecting the spectral characteristics.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An optical filter comprising:
   a first substrate;
   a first mirror formed on the first substrate;
   a second substrate coupled to the first substrate, the second substrate including a concave portion; and
   a second mirror formed on the concave portion and facing the first mirror;
   the first substrate including:
      a first portion located on the first mirror,
      a second portion located surrounding an outer periphery of the first portion and located outwardly of the outer periphery of the first portion as viewed along a first direction normal to a reflective surface of the first mirror facing a reflective surface of the second mirror,
      a third portion located surrounding an outer periphery of the second portion and located outwardly of the outer periphery of the second portion as viewed along the first direction normal to the reflective surface of the first mirror facing the reflective surface of the second mirror, and
      a fourth portion located surrounding an outer periphery of the third portion and located outwardly of the outer periphery of the third portion as viewed along the first direction normal to the reflective surface of the first mirror facing the reflective surface of the second mirror,
   both a thickness of the second portion and a thickness of the fourth portion being smaller than a thickness of the first portion.

2. The optical filter according to claim 1, wherein the thickness of the second portion is equal to or smaller than the thickness of the fourth portion.

3. The optical filter according to claim 1, wherein both the second portion and the fourth portion are formed by selective removal of the first substrate.

4. The optical filter according to claim 1, wherein the second portion, the third portion and the fourth portion are integrated.

5. The optical filter according to claim 1, wherein the first substrate and the second substrate are optically transparent.

6. An optical module having the optical filter according to claim 1.

7. An optical filter comprising:
   a first substrate;
   a first mirror formed on the first substrate;
   a second substrate coupled to the first substrate, the second substrate including a concave portion; and
   a second mirror formed on the second substrate and facing the first mirror;
   the first substrate including:
      a first portion located on the first mirror,
      a second portion located surrounding the first portion as viewed along a first direction normal to a reflective surface of the first mirror facing a reflective surface of the second mirror,
      a third portion located surrounding the second portion and farther from the first portion than the second portion from the first portion as viewed along the first direction normal to the reflective surface of the first mirror facing the reflective surface of the second mirror, and a fourth portion located surrounding third portion and farther from the first portion than the third portion from the first portion as viewed along the first direction normal to the reflective surface of the first mirror facing the reflective surface of the second mirror, both a thickness of the second portion and a thickness of the fourth portion being smaller than a thickness of the first portion.

* * * * *